(12) United States Patent
Wu et al.

(10) Patent No.: US 12,269,507 B2
(45) Date of Patent: Apr. 8, 2025

(54) DISTRIBUTIONAL EXPERT DEMONSTRATIONS FOR AUTONOMOUS DRIVING

(71) Applicant: Baidu USA LLC, Sunnyvale, CA (US)

(72) Inventors: Szu-Hao Wu, Sunnyvale, CA (US); Shu Jiang, Sunnyvale, CA (US); Yu Cao, Sunnyvale, CA (US); Weiman Lin, Sunnyvale, CA (US); Ang Li, Sunnyvale, CA (US); Jiangtao Hu, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 314 days.

(21) Appl. No.: 17/843,546

(22) Filed: Jun. 17, 2022

(65) Prior Publication Data
US 2023/0406345 A1  Dec. 21, 2023

(51) Int. Cl.
*B60W 60/00* (2020.01)
*B60W 30/18* (2012.01)
*B60W 50/00* (2006.01)

(52) U.S. Cl.
CPC .. *B60W 60/0011* (2020.02); *B60W 30/18163* (2013.01); *B60W 50/00* (2013.01); *B60W 60/001* (2020.02); *B60W 2050/0028* (2013.01); *B60W 2520/10* (2013.01); *B60W 2520/105* (2013.01); *B60W 2555/60* (2020.02)

(58) Field of Classification Search
CPC ....... B60W 60/0011; B60W 30/18163; B60W 50/00; B60W 60/001; B60W 2050/0028; B60W 2520/10; B60W 2520/105; B60W 2555/60
See application file for complete search history.

(56) References Cited

U.S. PATENT DOCUMENTS

| | | | |
|---|---|---|---|
| 11,493,926 B2* | 11/2022 | He | G06N 3/006 |
| 11,545,033 B2* | 1/2023 | Li | G06N 3/04 |
| 2009/0088916 A1* | 4/2009 | Elgersma | G05D 1/106 |
| | | | 701/23 |
| 2018/0124423 A1* | 5/2018 | Choi | G06V 10/82 |
| 2018/0374359 A1* | 12/2018 | Li | G06V 10/7788 |
| 2019/0369637 A1* | 12/2019 | Shalev-Shwartz | G06V 20/56 |
| 2020/0142420 A1* | 5/2020 | Kusari | G05D 1/0221 |

(Continued)

*Primary Examiner* — Dale W Hilgendorf
(74) *Attorney, Agent, or Firm* — WOMBLE BOND DICKINSON (US) LLP

(57) ABSTRACT

The present disclosure provides methods and techniques for evaluating and improving algorithms for autonomous driving planning and control (PNC), using one or more metrics (e.g., similarity scores) computed based on expert demonstrations. For example, the one or more metrics allow for improving PNC based on human, as opposed to or in addition to optimizing certain oversimplified properties, such as the least distance or time, as an objective. When driving in certain scenarios, such as taking a turn, people may drive in a distributed probability pattern instead of in a uniform line (e.g., different speeds and different curvatures at the same corner). As such, there can be more than one "correct" control trajectory for an autonomous vehicle to perform in the same turn. Safety, comfort, speeds, and other criteria may lead to different preferences and judgment as to how well the controlled trajectory has been computed.

18 Claims, 13 Drawing Sheets

(56) References Cited

U.S. PATENT DOCUMENTS

| | | | | |
|---|---|---|---|---|
| 2020/0283016 | A1* | 9/2020 | Blaiotta | B60W 60/0011 |
| 2020/0363813 | A1* | 11/2020 | He | G05D 1/0221 |
| 2020/0363814 | A1* | 11/2020 | He | G06N 3/006 |
| 2021/0011475 | A1* | 1/2021 | Haputhanthri | G05D 1/0088 |
| 2021/0173402 | A1* | 6/2021 | Chang | G05D 1/0221 |
| 2021/0181738 | A1* | 6/2021 | Jiang | G06T 7/35 |
| 2021/0294341 | A1* | 9/2021 | Oh | B60W 60/0011 |
| 2021/0323578 | A1* | 10/2021 | Wang | B60W 50/045 |
| 2021/0370962 | A1* | 12/2021 | Zhu | B60W 50/085 |
| 2022/0048527 | A1* | 2/2022 | Geiger | G06N 3/08 |
| 2022/0135075 | A1* | 5/2022 | Ng | G06F 9/505 |
| | | | | 701/301 |
| 2022/0212693 | A1* | 7/2022 | Fang | B60W 60/0011 |
| 2022/0227397 | A1* | 7/2022 | Jiang | G06F 11/3013 |
| 2022/0340138 | A1* | 10/2022 | Seegmiller | B60W 30/045 |
| 2022/0379917 | A1* | 12/2022 | Henke | B60W 60/0015 |
| 2023/0080319 | A1* | 3/2023 | Zhang | G01C 21/3807 |
| | | | | 701/26 |
| 2023/0159047 | A1* | 5/2023 | Jiang | G06N 3/006 |
| | | | | 701/25 |
| 2024/0017741 | A1* | 1/2024 | Sandberg | G01C 21/3407 |
| 2024/0042993 | A1* | 2/2024 | Yaghoubi | B60W 30/08 |

* cited by examiner

DISTRIBUTIONAL EXPERT DEMONSTRATIONS FOR AUTONOMOUS DRIVING

TECHNICAL FIELD

Embodiments of the present disclosure relate generally to operating autonomous driving vehicles. More particularly, embodiments of the disclosure relate to planning and control (PNC).

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Motion planning and control (PNC) are critical operations in autonomous driving. However, conventional motion planning operations estimate the difficulty of completing a given path mainly from its curvature and speed, without considering the differences in features for different types of vehicles. Same motion planning and control is applied to all types of vehicles, which may not be accurate and smooth under some circumstances.

Methods or criteria that properly evaluate PNC computation are desired. For example, PNC computation may need be optimized or improved to comply with social expectations, on top of deterministic output.

BRIEF DESCRIPTION OF THE DRAWINGS

Embodiments of the disclosure are illustrated by way of example and not limitation in the figures of the accompanying drawings in which like references indicate similar elements.

Like numerals indicate like elements.

DETAILED DESCRIPTION

Figure 1:
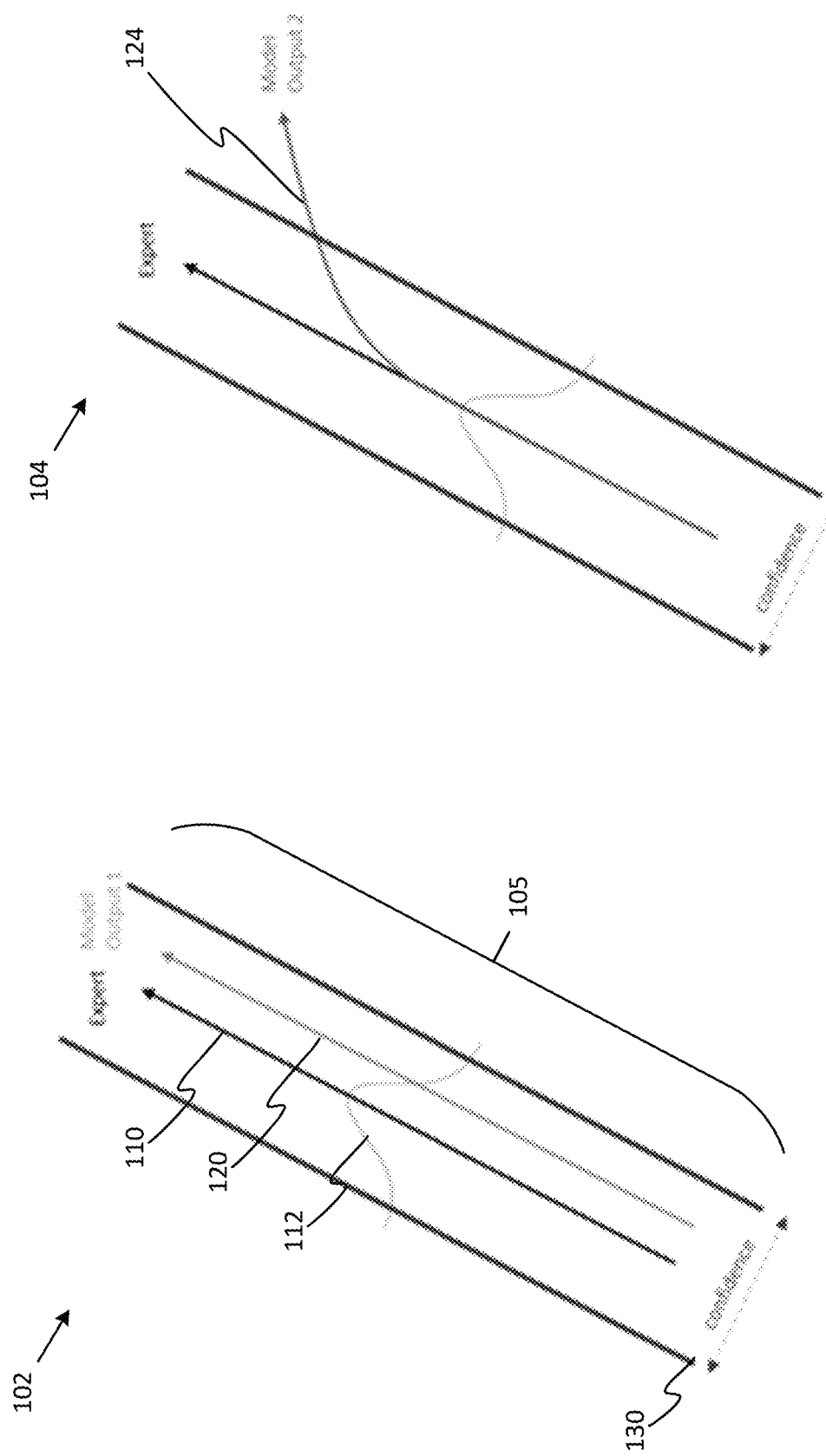
FIG. 1 illustrates different computed controlled trajectories in comparison to expert demonstrations in a scenario, according to aspects of the present disclosure.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

The present disclosure provides methods and techniques for evaluating and improving algorithms for autonomous driving planning and control (PNC), using one or more metrics (e.g., similarity scores) computed based on human driving behaviors (e.g., expert demonstrations). For example, the one or more metrics allow for improving PNC based on human behaviors (and therefore, human expectations), as opposed to (or in addition to) optimizing certain oversimplified properties, such as the least distance or time, as an objective. When driving in certain scenarios, such as taking a turn, people may drive in a distributed probability pattern instead of in a uniform line (e.g., different speeds and different curvatures at the same corner). As such, there can be more than one "correct" control trajectory for an autonomous vehicle to perform in the same turn. Safety, comfort, speeds, and other criteria may lead to different preferences and judgment as to how well the controlled trajectory has been computed. As disclosed herein, a similarity score is generated to evaluate PNC results computed by autonomous algorithms based on observations or measurements over actual human performances, which is referred to as expert demonstrations below.

The present disclosure focuses on autonomous driving units (ADU), specifically, on PNC's improvements in control, decision making, planning, and behavior prediction. For autonomous driving algorithm, expert demonstrations are used as criteria or ground truths to compute the cost in learning-based algorithms (e.g., machine-learning, deep learning, or artificial intelligence/AI). In existing practice, the similarity comparison between expert demonstrations and algorithm results is difficult or ill-defined, but crucial. The present disclosure provides methods to make effective comparisons to expert demonstrations reliable and practical, for optimizing and fine-tuning the learning-based algorithms.

In existing methods for comparing expert demonstrations, the accumulated differences of vehicle trajectory (distance, speed, acceleration) are compared between expert trajectory and algorithm model outputs. However, such differences often cannot accurately evaluate the algorithm model outputs based on the expert demonstrations. That is, such methods based on differences alone often cannot tell the distinctions between an acceptable driving output and an unacceptable driving output, when neither is a perfect match to the expert demonstration. According to aspects of the present disclosure, a (one or more) probability distribution model is used to characterize, represent, or express the expert demonstrations. Similarly, another probability distribution representation is generated to map the autonomous driving algorithm output. The two probability distribution characterizations may then be compared—by a similarity score to quantify how well the autonomous driving algorithm is behaving and provide a basis for improvement or the next computational iteration.

According to some embodiments, a computer-implemented method may include generating, by a processing device, a controlled trajectory of an autonomous driving vehicle (ADV) in a scenario. The controlled trajectory may be executable by the ADV to drive autonomously in the scenario. The method further includes receiving a set of data acquired in a number of driving demonstrations in the scenario and identifying a distribution pattern of the set of data acquired. The distribution pattern indicates probabilities of driving trajectories in the scenario. The processing device may compute a similarity score based on comparisons between the controlled trajectory and the distribution pattern of the number of driving trajectories.

In some cases, the method further includes adjusting, based on the similarity score, at least one parameter in generating the controlled trajectory of the ADV in the scenario and generating an updated controlled trajectory. The updated controlled trajectory corresponds to an updated similarity score higher than the similarity score computed previously. The updated controlled trajectory is executable by the ADV to drive autonomously in the scenario.

In some cases, generating the controlled trajectory of the ADV in the scenario may include generating a number of candidate trajectories subject to a probability distribution pattern. In some cases, computing the similarity score may include at least one of: calculating a Kullback-Leibler divergence; calculating an f-divergence; calculating ah H-divergence; determining one or more integral probability metrics; or evaluating a probability density of a predicted value of a probability distribution function of the distribution pattern.

In some cases, the scenario includes: a starting location and an initial speed vector; an ending location and a final speed vector; and at least one of: a static side boundary, an available width along the static side boundary, a dynamic side boundary, or a width variation caused by the dynamic side boundary. For example, the scenario may include at least one of: a turn or a sequence change of directions, an overtake, a compliance to traffic signs, or a timed attempt thereof.

In some cases, the method further includes computing a first mean square error and a first similarity score between a first controlled trajectory generated by the processing device and the set of data of the number of driving demonstrations in the scenario. The method includes computing a second mean square error and a second similarity score between a second controlled trajectory generated by the processing device and the set of data of the number of driving demonstrations in the scenario. The first mean square error is greater than the second mean square error while the first similarity score is higher than the second similarity score. The method further includes discarding the second controlled trajectory and parameters associated therewith.

In some cases, the distribution pattern includes an observed feature distribution of distances, speeds, or accelerations, or an embedding feature distribution of latent space features in a deep learning layer that processes the set of data acquired in the plurality of driving demonstrations. In some cases, the number of driving demonstrations may include demonstrations performed in a simulation environment.

According to some embodiments, a computational device may include a memory and a processing device coupled to the memory. The processing device and the memory are configured to generate a controlled trajectory of an autonomous driving vehicle (ADV) in a scenario. The controlled trajectory is executable by the ADV to drive autonomously in the scenario. The processing device and the memory are configured to receive a set of data acquired in a plurality of driving demonstrations in the scenario. The processing device then identifies a distribution pattern of the set of data acquired, the distribution pattern indicating probabilities of driving trajectories in the scenario. The processing device further computes a similarity score based on comparisons between the controlled trajectory and the distribution pattern of the plurality of driving demonstrations.

According to some embodiments, a non-transitory computer-readable storage medium having instructions stored thereon that, when executed by a processing device, cause the processing device to: generate a controlled trajectory of an autonomous driving vehicle (ADV) in a scenario. The controlled trajectory is executable by the ADV to drive autonomously in the scenario. The non-transitory computer-readable storage medium further includes instructions to cause the processing device to receive a set of data acquired in a plurality of driving demonstrations in the scenario and identify a distribution pattern of the set of data acquired. The distribution pattern indicates probabilities of driving trajectories in the scenario. The non-transitory computer-readable storage medium further includes instructions to cause the processing device to compute a similarity score based on comparisons between the controlled trajectory and the distribution pattern of the plurality of driving demonstrations.

FIG. 1 illustrates different computed controlled trajectories 120 and 124 in comparison to expert demonstrations 110 in a scenario 105, according to aspects of the present disclosure. As shown in FIG. 1, an objective for planning and controlling an autonomous vehicle to drive through the scenario 105 includes providing proper speed and direction controls over a reasonable amount of time. A scenario refers to any terrain to be traversed by the autonomous vehicle (or any vehicle having driving control assistance). For example, a scenario may include a starting location/position and an initial speed vector of the ADV, an ending location/position and a final speed vector of the ADV, and at least one of: a static side boundary, an available width along the static side boundary, a dynamic side boundary, or a width variation caused by the dynamic side boundary. A dynamic side boundary may be associated with one or more dynamic obstacles, such as other vehicles, pedestrians, or obstacles that are not included in the data set when the controlled trajectories are computed.

As shown in FIG. 1, a probability distribution 112 of expert demonstration 110 is computed. The expert demonstration 110 may include actual human driving data as well as simulated driving data. For example, when the scenario 105 corresponds to a portion of a map in the real world environment, the expert demonstration 110 may include multiple trips (e.g., tens or hundreds) performed by one or more human drivers. The expert demonstration 110 may include both user input (e.g., pedals and steering controls) as well as vehicle behavior (e.g., measured speeds, accelerations, changes of directions and coordinates, etc.) in the multiple trips. When the scenario 105 corresponds to a virtual environment, the scenario 105 may include a simulated environment matching feature of a real environment, including road conditions and vehicle performance aspects. The expert demonstration 110 may be acquired by recording user input to the virtual environment.

Each expert demonstration dataset may include information regarding time of a day, time stamps for the movement of the ADV, speeds, accelerations, traveling directions, and other information (e.g., road conditions, obstacles, etc.). One or more of such data types of a number of datasets may be compiled, transformed, or expressed as the probability distribution pattern 112 and the representative trajectory of expert demonstration 110. For example, the probability distribution pattern 112 may be fitted to a probability distribution pattern or model, such as the normal distribution (e.g., Gaussian distribution), Cauchy distribution, Johnson SU distribution, Laplace distribution, etc. As such, the probability distribution 112 may be characterized by one or more key parameters for ease of management.

As shown in FIG. 1, the arrow trajectory of the expert demonstration 110 may be considered as an ideal line in the scenario, and a goal for the ADV's algorithmic output. The expert demonstration 110 may be bounded by a confidence level 130, within which the ADV's algorithmic output is acceptable. Two algorithmic outputs 120 and 124 are respectfully shown in the examples 102 and 104, to illustrate an important aspect of algorithmic evaluation.

Conventionally, an algorithmic output, when compared to expert demonstration data, is evaluated by the accumulated difference between the output and the representative trajectory of the expert demonstration (i.e., ignoring probability distribution). Furthermore, as shown in the example 104, the accumulated difference may be small overall (e.g., across the whole scenario) but may deviate locally to an unacceptable degree (resulting in unsafe or impractical trajectory planning for the ADV).

By comparison, the accumulated difference between the algorithmic output 120 of the example 102 may be greater, yet the overall algorithmic output is fully within the confidence level 130, resulting in a more desirable controlled trajectory output 120 than the output 124 in the example 104. The present disclosure provides techniques and methods for characterizing the similarity between an algorithmic output and the expert demonstration by evaluation based on probability distributions and overall conformity. For example, a similarity score computed based on at least one of a Kullback-Leibler divergence, an f-divergence, an H-divergence. In some cases, the similarity score may also be determined as one or more integral probability metrics. The similarity score may be computed by evaluating a probability density of a predicted value of a probability density/distribution function (PDF) of the distribution pattern.

Figure 2:
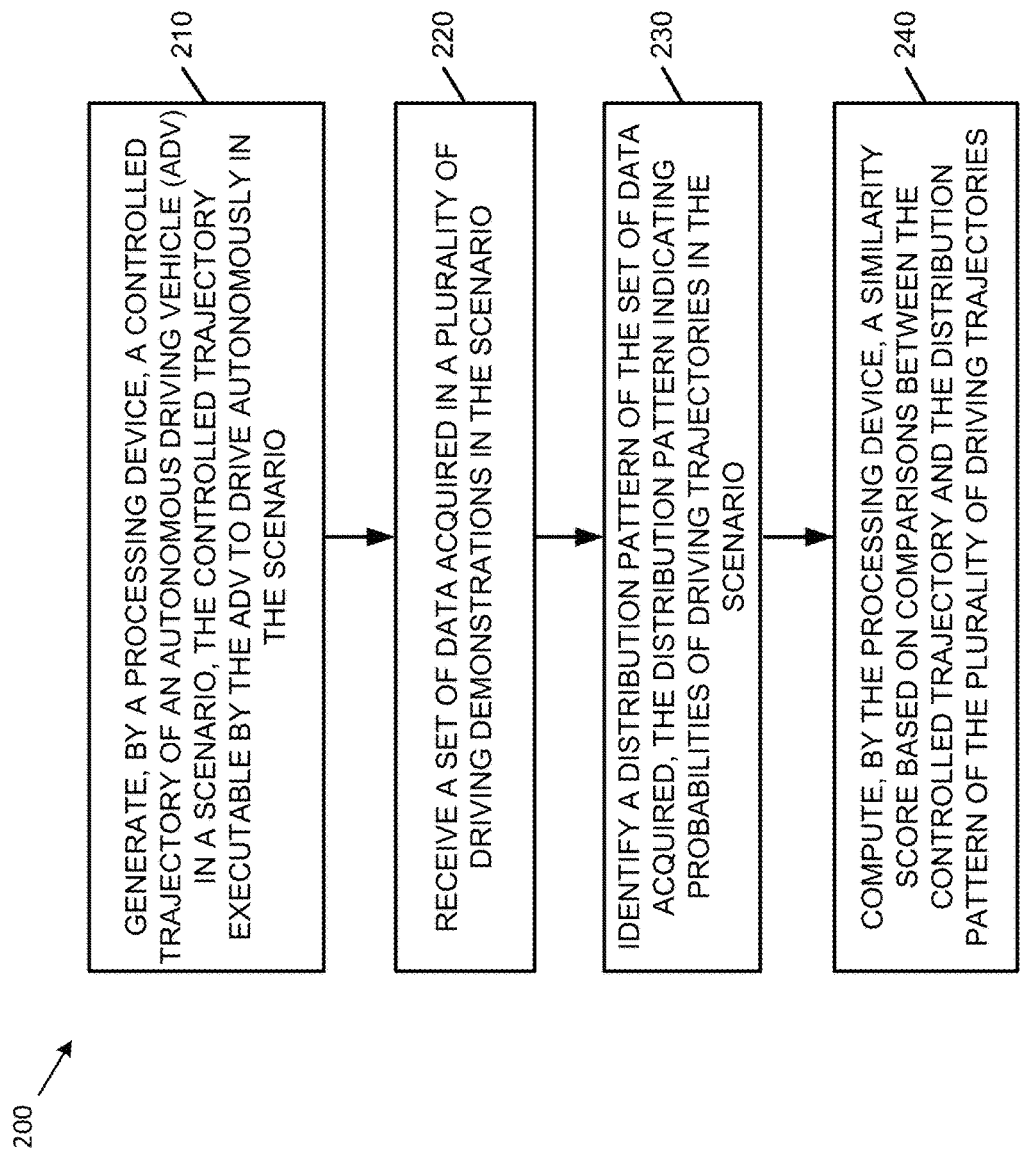
FIG. 2 illustrates a flow diagram of methods of operations, according to aspects of the present disclosure.

FIG. 2 illustrates a flow diagram of methods of operations 200, according to aspects of the present disclosure. The operations 200 may be performed by a processing device or a data processing system such as a computer or data analytics system.

The operations 200 may begin, at block 210, by generating, by a processing device, a controlled trajectory of an ADV in a scenario. The controlled trajectory is generated by a planning module of an ADV to drive autonomously in the scenario. For example, the controlled trajectory may include a planned behavior of the ADV and control input (e.g., speeds and steering controls) needed to realize such a planned behavior. Such trajectory data may be generated and collected during autonomous driving of an ADV. Alternatively, such data may be generated by an autonomous driving simulation system.

At block 220, the processing device receives a set of data acquired in a number of driving demonstrations in the scenario. As mentioned above, the number of driving demonstrations may include real-world driving data acquisition as well as simulation data. In some cases, the simulation data may also include data generated by validated autonomous driving algorithms, models, or simulations.

At block 230, a distribution pattern of the set of data acquired is identified. The distribution pattern may indicate probabilities of driving trajectories in the scenario. For example, a same expert driver may perform slightly differently every time driving through the scenario, due to various changing conditions or performance variations. In some cases, instead of seeking or defining a "best" or "model" driving trajectory, the algorithmic solution in PNC may compute a range of viable options, applicable in different conditions. The probability distribution pattern of the expert demonstration may thus provide a good basis for evaluating and/or training the autonomous driving algorithm.

At block 240, the processing device computes a similarity score based on comparisons between the controlled trajectory and the distribution pattern of the plurality of driving demonstrations. In some cases, the similarity score may be used to select or identify how well an algorithm performs and/or what parameters may be used to achieve certain performance of a given algorithm. In some cases, the similarity score may be used to improve subsequent iterations of the controlled trajectories.

For example, the processing device may further adjust, based on the similarity score, at least one parameter in generating the controlled trajectory of the ADV in the scenario. The processing device may generate an updated controlled trajectory. The updated controlled trajectory corresponds to an updated similarity score higher than the similarity score computed previously. The updated controlled trajectory is also executable by the ADV to drive autonomously in the scenario.

Figure 3:
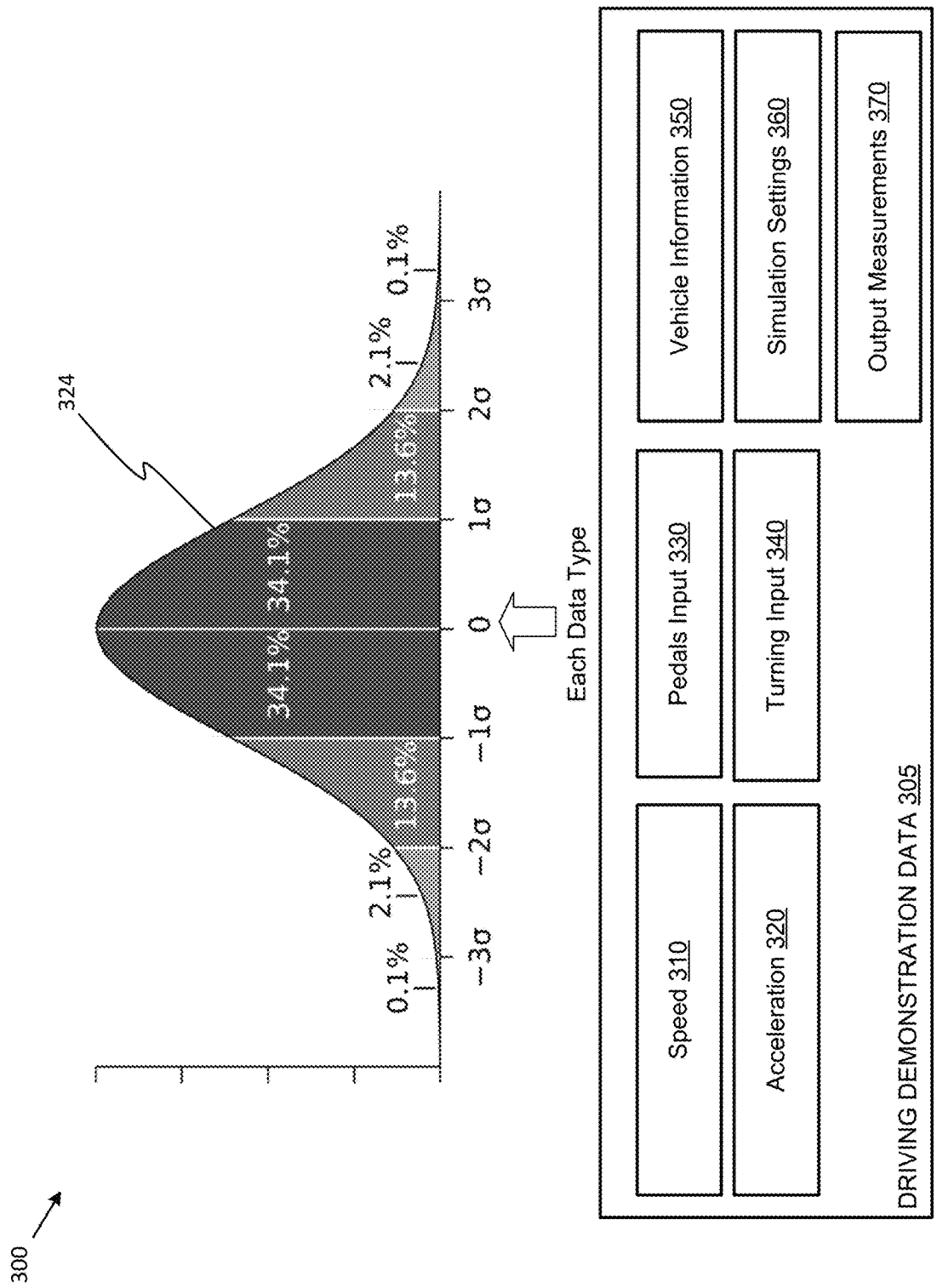
FIG. 3 illustrates an example distribution of driving demonstration data, according to aspects of the present disclosure.

FIG. 3 illustrates an example distribution 300 of driving demonstration data (or dataset) 305, according to aspects of the present disclosure. Such data may be collected from various ADVs during autonomous driving. Alternatively, the data may be generated by an autonomous driving simulation system. As shown, the driving demonstration data 305 includes speed measurements 310, acceleration measurements 320, pedals (both the gas pedal and the brake pedal, and may include the clutch pedal) input 330, turning or steering input 340, vehicle information 350, simulation settings 360, and various output measurements 370 (e.g., positions over time and derivatives thereof). Each data type may be analyzed or summarized into a corresponding distribution pattern, such as the distribution pattern 324 as shown.

In some cases, the vehicle information 350 and/or simulation settings 360 may include operational conditions, such as terrain slopes, where the pitch angle and roll angle may vary in a scenario (e.g., dependent on specific route in the scenario, the angles variations may have different profiles). The vehicle information 350 and simulation settings 360 may use such information to limit comparable algorithmic output or adjust the measurements accordingly (e.g., normalizing the data to remove the effects by the pitch and roll angles).

In some cases, the vehicle information 350 and/or simulation settings 360 may include multiple parameters that have effects on the algorithmic output for controlling an ADV, such as engine power, tire size, handling characteristics, etc. Accounting for the specific conditions allows for accurate computation of the similarity scores.

Figure 4:
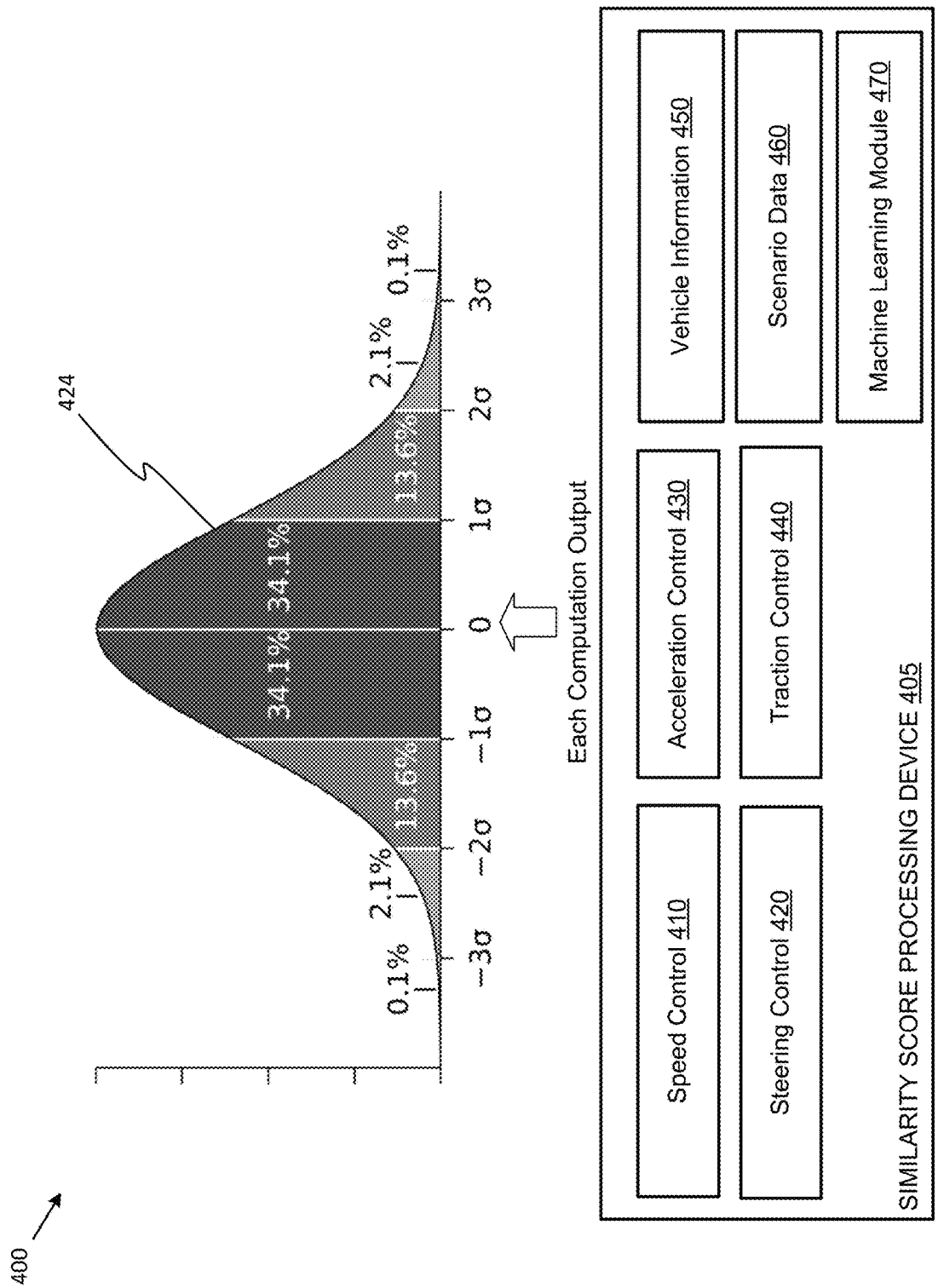
FIG. 4 illustrates an example distribution of output of controlled trajectories for computing a similarity score by a processing device, according to aspects of the present disclosure.

FIG. 4 illustrates an example distribution 400 of output of controlled trajectories for computing a similarity score by a processing device 405, according to aspects of the present disclosure. As shown, the similarity score processing device 405 may process or compute distribution patterns (such as the probability distribution pattern 424 for one of the data types) for the speed control 410, the steering control 420, the acceleration control 430, and the traction control 440. The similarity score processing device 405 may further include vehicle information 450 and scenario data 460 for identifying and matching algorithmic output to corresponding expert demonstrations. In some cases, the similarity score processing device 405 includes a machine learning module 470 for utilizing the dataset analyzed by the similarity score processing device 405 for improving or optimizing autonomous algorithms.

Referring to both FIGS. 3 and 4, the similarity score processing device 405 may determine respective similarity scores to the same data types. For example, the speed measurement 310 probability distribution may be used to evaluate the speed control 410 output by an algorithm. Similarly, the turning input 340 may be used to evaluate the steering control 420, and the acceleration 320 and the pedals input 330 used to evaluate the acceleration control 430.

In some cases, the output measurements 370 (e.g., position changes) may be different from computations based on initial conditions and the speed/acceleration measurements 310 and 320. For example, the speed measurement sensors may be based on onboard sensors monitoring wheel movements instead of using GPS location derivatives. As such, there may be differences among the measurements when the vehicle slips or drifts relative to the ground. The output measurements 370 may use vehicle-to-everything (V2X), GPS data, and other external sensors to obtain movement data of the vehicle's traction control, which may evaluate the traction control 440 output by an algorithm.

Figure 5:
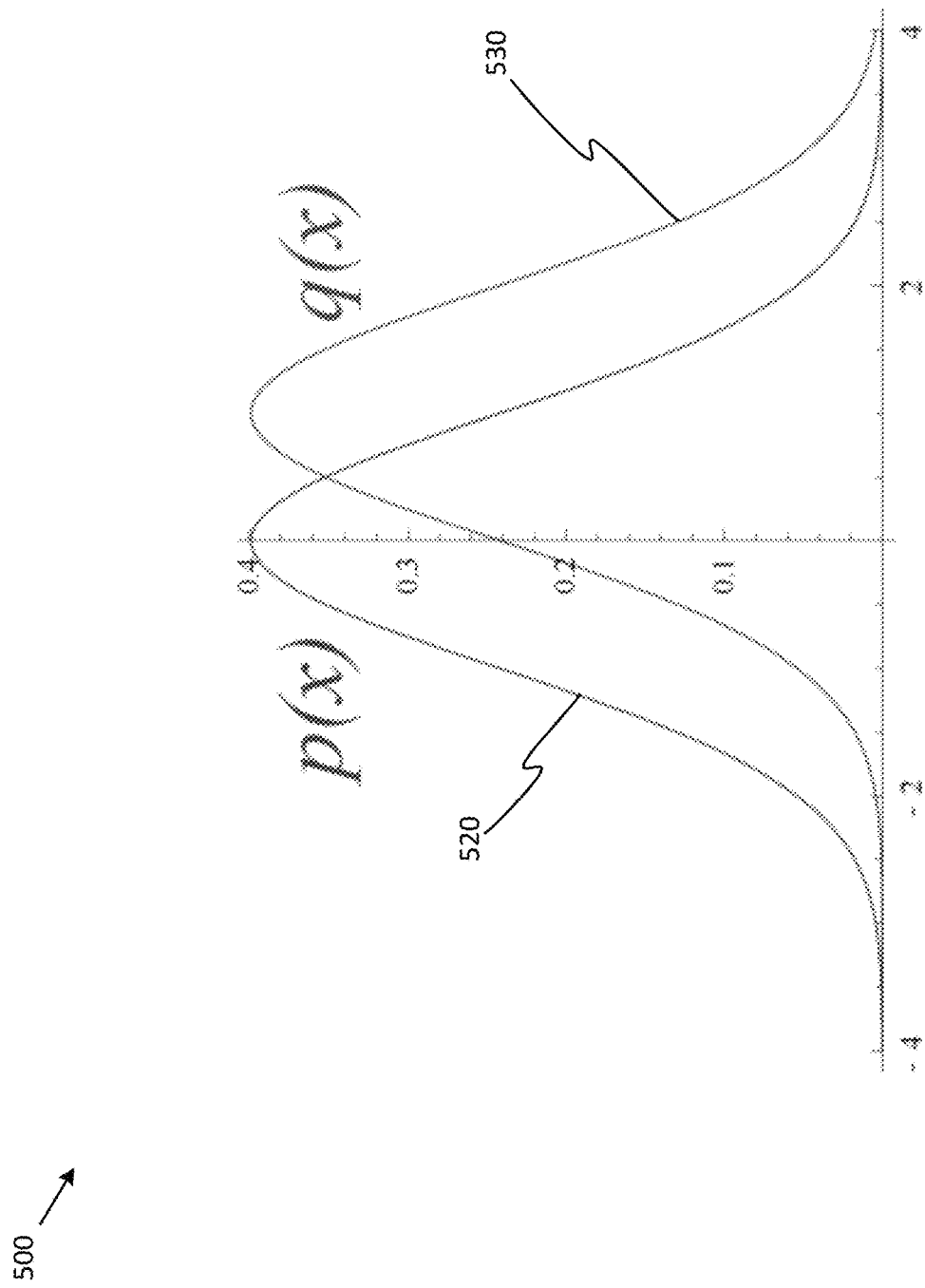
FIG. 5 illustrates an example computation of probability density functions to determine a similarity score, according to aspects of the present disclosure.

FIG. 5 illustrates an example 500 computation of probability density/distribution functions (p(x) and q(x)) to determine a similarity score, according to aspects of the present disclosure. As shown, the expert demonstration dataset may result in a first probability distribution pattern 520 p(x) (or P(x), or P) and an autonomous driving algorithm outputs results in a second probability distribution pattern 530 q(x) (or Q(x), or Q). The similarity score may be computed by calculating a Kullback-Leibler divergence (K-L divergence, or I-divergence); an f-divergence; or an H-divergence. In some cases, the similarity score may be computed by determining one or more integral probability metrics, as well as by evaluating a probability density of a predicted value of a probability distribution of the distribution pattern 520.

For example, the K-L divergence is a statistical distance (expressed as $D_{KL}(P|Q)$) measuring how the probability distribution 530 (P(x)) is different from the probability distribution 520 (Q(x)), and is calculated as:

$$D_{KL}(P\|Q) = \sum_{x \in X} P(x) \log\left(\frac{P(x)}{Q(x)}\right).$$

The f-divergence (expressed as $D_f(P|Q)$) provides an average, weighted by a function f, of the odds ratio given by the probability distribution 530 (P(x) or P) and the probability distribution 520 (Q(x) or Q). The f-divergence of P from Q is calculated as:

$$D_f(P\|Q) \equiv \int_\Omega f\left(\frac{dP}{dQ}\right) dQ.$$

Other comparison metrics for characterizing the differences between the probability distributions 530 q(x) and 520 p(x) of FIG. 5 may be used to represent the similarity score. Importantly, a high similarity score (e.g., small differences between the two distribution patterns) may correspond to a greater accumulative differences (as shown in the examples in FIG. 1). Conventional evaluation methods may remove such algorithmic output while here, based on the similarity score, such results will remain.

For example, a first mean square error and a first similarity score may be computed between a first controlled trajectory generated by the processing device and the set of data of the plurality of driving demonstrations in the scenario. A second mean square error and a second similarity score may be computed between a second controlled trajectory generated by the processing device and the set of data of the plurality of driving demonstrations in the scenario. The first mean square error is greater than the second mean square error while the first similarity score is higher than the second similarity score. Because the results of the similarity scores may better reflect the practicality in performing autonomous driving in view of the expert demonstrations, the second controlled trajectory and parameters associated therewith are discarded, albeit the second mean square error is smaller.

Although the above comparison is based on mean square errors, which are often used as conventional criterion for evaluating acceptability, in other instances, other different criteria (e.g., computing L_n norms) may be used. The similarity scores disclosed herein may nonetheless better reflect the practicality in performing autonomous driving in view of the expert demonstrations.

Figure 6:
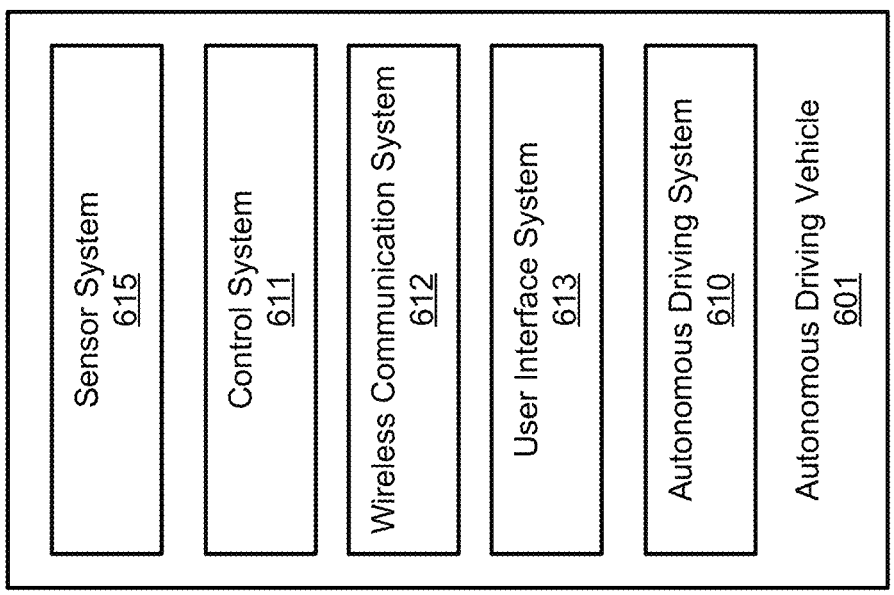
FIG. 6 is a block diagram illustrating an autonomous driving vehicle according to one embodiment.

FIG. 6 is a block diagram illustrating an autonomous driving vehicle according to one embodiment of the disclosure. Referring to FIG. 6, autonomous driving vehicle 601 may be communicatively coupled to one or more servers over a network, which may be any type of networks such as a local area network (LAN), a wide area network (WAN) such as the Internet, a cellular network, a satellite network, or a combination thereof, wired or wireless. The server(s) may be any kind of servers or a cluster of servers, such as Web or cloud servers, application servers, backend servers, or a combination thereof. A server may be a data analytics server, a content server, a traffic information server, a map and point of interest (MPOI) server, or a location server, etc.

An autonomous driving vehicle refers to a vehicle that can be configured to in an autonomous mode in which the vehicle navigates through an environment with little or no input from a driver. Such an autonomous driving vehicle can include a sensor system having one or more sensors that are configured to detect information about the environment in which the vehicle operates. The vehicle and its associated controller(s) use the detected information to navigate through the environment. Autonomous driving vehicle 601 can operate in a manual mode, a full autonomous mode, or a partial autonomous mode.

In one embodiment, autonomous driving vehicle 601 includes, but is not limited to, autonomous driving system (ADS) 610, vehicle control system 611, wireless communication system 612, user interface system 613, and sensor system 615. Autonomous driving vehicle 601 may further include certain common components included in ordinary vehicles, such as, an engine, wheels, steering wheel, transmission, etc., which may be controlled by vehicle control system 611 and/or ADS 610 using a variety of communication signals and/or commands, such as, for example, acceleration signals or commands, deceleration signals or commands, steering signals or commands, braking signals or commands, etc.

Components 610-615 may be communicatively coupled to each other via an interconnect, a bus, a network, or a combination thereof. For example, components 610-615 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 7:
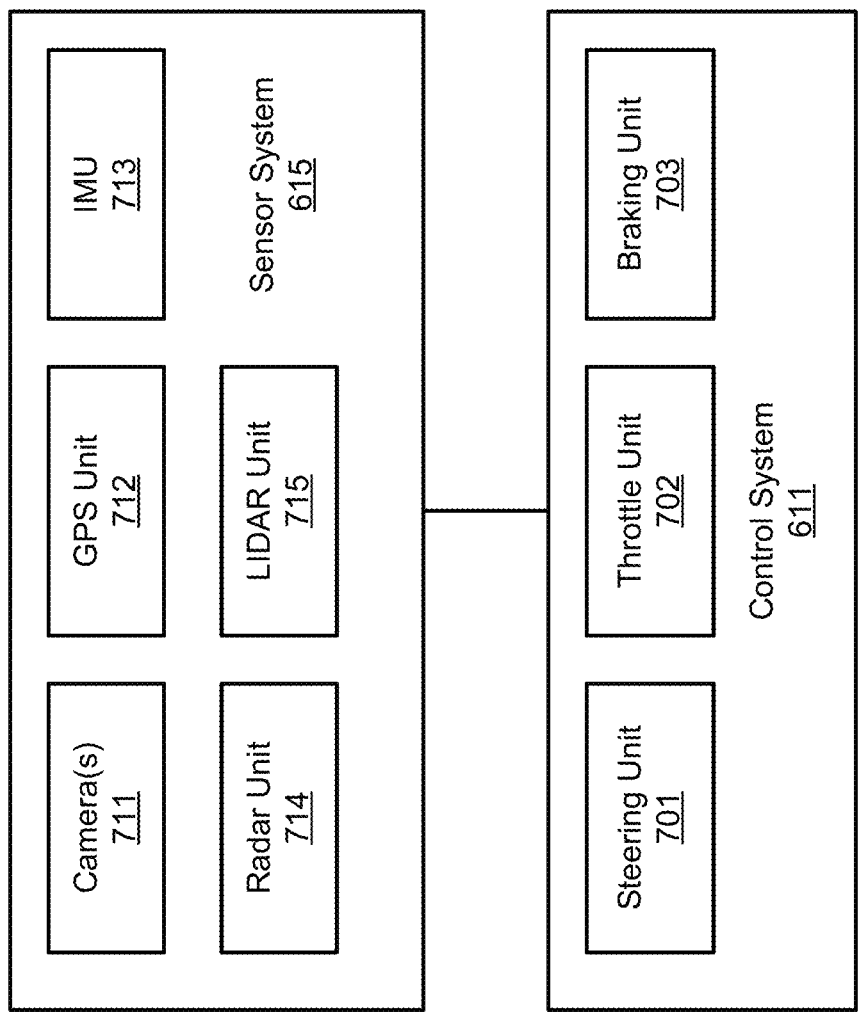
FIG. 7 is a block diagram illustrating an example of an autonomous driving vehicle according to one embodiment.

Referring now to FIG. 7, in one embodiment, sensor system 615 includes, but it is not limited to, one or more cameras 711, global positioning system (GPS) unit 712, inertial measurement unit (IMU) 713, radar unit 714, and a light detection and range (LIDAR) unit 715. GPS system 712 may include a transceiver operable to provide information regarding the position of the autonomous driving vehicle. IMU unit 713 may sense position and orientation changes of the autonomous driving vehicle based on inertial acceleration. Radar unit 714 may represent a system that utilizes radio signals to sense objects within the local environment of the autonomous driving vehicle. In some embodiments, in addition to sensing objects, radar unit 714 may additionally sense the speed and/or heading of the objects. LIDAR unit 715 may sense objects in the environment in which the autonomous driving vehicle is located using lasers. LIDAR unit 715 could include one or more laser sources, a laser scanner, and one or more detectors, among other system components. Cameras 711 may include one or more devices to capture images of the environment surrounding the autonomous driving vehicle. Cameras 711 may be still cameras and/or video cameras. A camera may be mechanically movable, for example, by mounting the camera on a rotating and/or tilting a platform.

Sensor system 615 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous driving vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 611 includes, but is not limited to, steering unit 701, throttle unit 702 (also referred to as an acceleration unit), and braking unit 703. Steering unit 701 is to adjust the direction or heading of the vehicle. Throttle unit 702 is to control the speed of the motor or engine that in turn controls the speed and acceleration of the vehicle. Braking unit 703 is to decelerate the vehicle by providing friction to slow the wheels or tires of the vehicle.

Note that the components as shown in FIG. 7 may be implemented in hardware, software, or a combination thereof.

Referring back to FIG. 6, wireless communication system 612 is to allow communication between autonomous driving vehicle 601 and external systems, such as devices, sensors, other vehicles, etc. For example, wireless communication system 612 can wirelessly communicate with one or more devices directly or via a communication network. Wireless communication system 612 can use any cellular communication network or a wireless local area network (WLAN), e.g., using WiFi to communicate with another component or system. Wireless communication system 612 could communicate directly with a device (e.g., a mobile device of a passenger, a display device, a speaker within vehicle 601), for example, using an infrared link, Bluetooth™, etc. User interface system 613 may be part of peripheral devices implemented within vehicle 601 including, for example, a keyboard, a touch screen display device, a microphone, and a speaker, etc.

Some or all of the functions of autonomous driving vehicle 601 may be controlled or managed by ADS 610, especially when operating in an autonomous driving mode. ADS 610 includes the necessary hardware (e.g., processor(s), memory, storage) and software (e.g., operating system, planning and routing programs) to receive information from sensor system 615, control system 611, wireless communication system 612, and/or user interface system 613, process the received information, plan a route or path from a starting point to a destination point, and then drive vehicle 601 based on the planning and control information. Alternatively, ADS 610 may be integrated with vehicle control system 611.

For example, a user as a passenger may specify a starting location and a destination of a trip, for example, via a user interface. ADS 610 obtains the trip related data. For example, ADS 610 may obtain location and route data from an MPOI server. The location server provides location services and the MPOI server provides map services and the POIs of certain locations. Alternatively, such location and MPOI information may be cached locally in a persistent storage device of ADS 610.

While autonomous driving vehicle 601 is moving along the route, ADS 610 may also obtain real-time traffic information from a traffic information system or server (TIS). Note that the servers may be operated by a third-party entity. Alternatively, the functionalities of the servers may be integrated with ADS 610. Based on the real-time traffic information, MPOI information, and location information, as well as real-time local environment data detected or sensed by sensor system 615 (e.g., obstacles, objects, nearby vehicles), ADS 610 can plan an optimal route and drive vehicle 601, for example, via control system 611, according to the planned route to reach the specified destination safely and efficiently.

Figure 8:
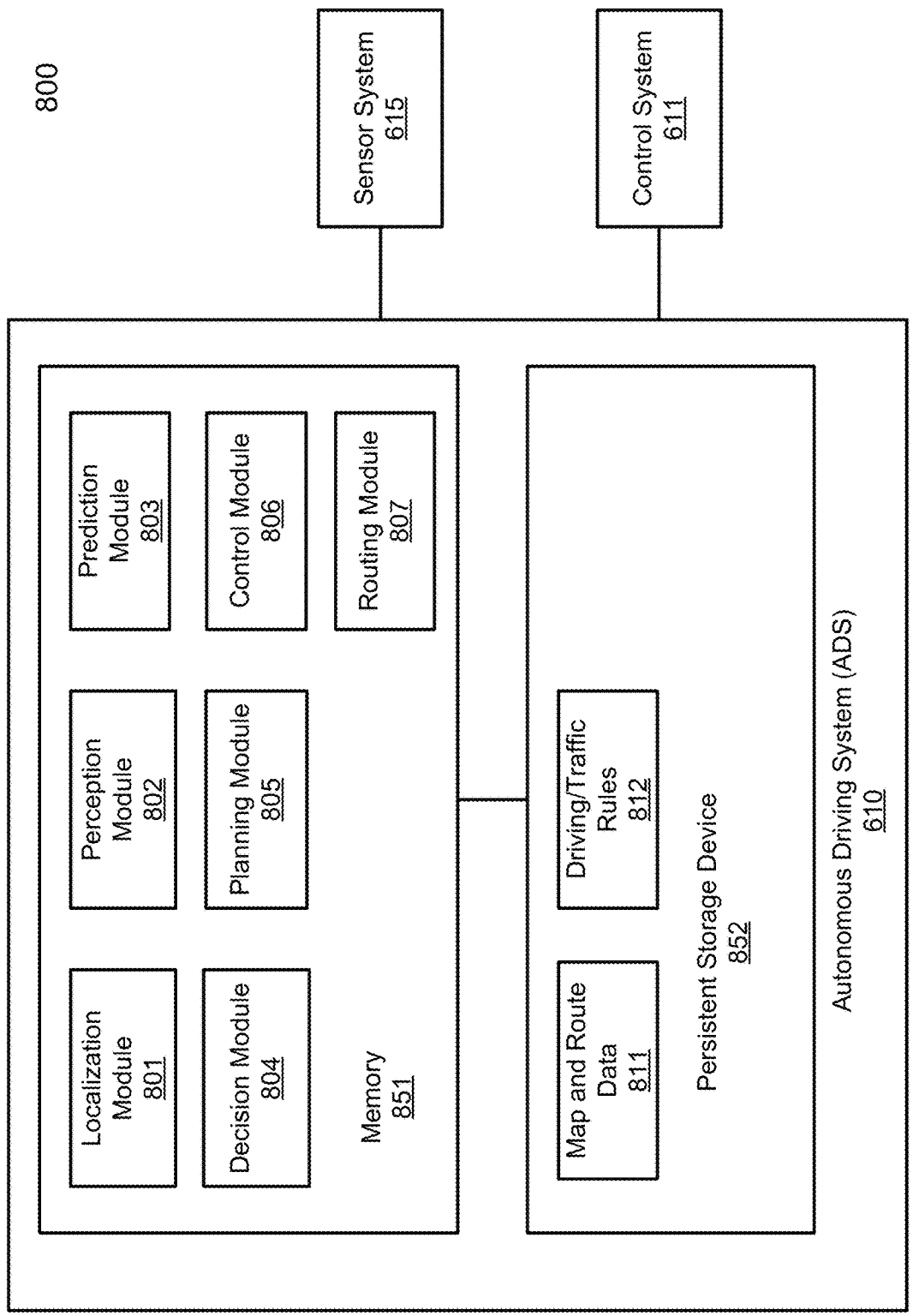
FIG. 8 is a block diagram illustrating an example of an autonomous driving system used with an autonomous driving vehicle according to one embodiment.

FIG. 8 is a block diagram illustrating an example of an autonomous driving system used with an autonomous driving vehicle according to one embodiment. System 800 may be implemented as a part of autonomous driving vehicle 601 of FIG. 6 including, but is not limited to, ADS 610, control system 611, and sensor system 615. Referring to FIG. 8, ADS 610 includes, but is not limited to, localization module 801, perception module 802, prediction module 803, decision module 804, planning module 805, control module 806, and a routing module 807.

Some or all of modules 801-809 may be implemented in software, hardware, or a combination thereof. For example, these modules may be installed in persistent storage device 852, loaded into memory 851, and executed by one or more processors (not shown). The persistent storage device 852 may include map and route data 811, and driving and traffic rules 812. Note that some or all of these modules may be communicatively coupled to or integrated with some or all modules of vehicle control system 611 of FIG. 7. Some of modules 801-809 may be integrated together as an integrated module.

Localization module 801 determines a current location of autonomous driving vehicle 601 (e.g., leveraging GPS unit 712) and manages any data related to a trip or route of a user. Localization module 801 (also referred to as a map and route module) manages any data related to a trip or route of a user. A user may log in and specify a starting location and a destination of a trip, for example, via a user interface. Localization module 801 communicates with other components of autonomous driving vehicle 601, such as map and route data 811, to obtain the trip related data. For example, localization module 801 may obtain location and route data from a location server and a map and POI (MPOI) server. A location server provides location services and an MPOI server provides map services and the POIs of certain locations, which may be cached as part of map and route data 811. While autonomous driving vehicle 601 is moving along the route, localization module 801 may also obtain real-time traffic information from a traffic information system or server.

Based on the sensor data provided by sensor system 615 and localization information obtained by localization module 801, a perception of the surrounding environment is determined by perception module 802. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 802 may include a computer vision system or functionalities of a computer vision system to process and analyze images captured by one or more cameras in order to identify objects and/or features in the environment of autonomous driving vehicle. The objects can include traffic signals, roadway boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 802 can also detect objects based on other sensors data provided by other sensors such as a radar and/or LIDAR.

For each of the objects, prediction module 803 predicts what the object will behave under the circumstances. The prediction is performed based on the perception data perceiving the driving environment at the point in time in view of a set of map/rout information 811 and traffic rules 812. For example, if the object is a vehicle at an opposing direction and the current driving environment includes an intersection, prediction module 803 will predict whether the vehicle will likely move straight forward or make a turn. If the perception data indicates that the intersection has no traffic light, prediction module 803 may predict that the vehicle may have to fully stop prior to enter the intersection. If the perception data indicates that the vehicle is currently at a left-turn only lane or a right-turn only lane, prediction module 803 may predict that the vehicle will more likely make a left turn or right turn respectively.

For each of the objects, decision module 804 makes a decision regarding how to handle the object. For example, for a particular object (e.g., another vehicle in a crossing route) as well as its metadata describing the object (e.g., a speed, direction, turning angle), decision module 804 decides how to encounter the object (e.g., overtake, yield, stop, pass). Decision module 804 may make such decisions according to a set of rules such as traffic rules or driving rules 812, which may be stored in persistent storage device 852.

Routing module 807 is configured to provide one or more routes or paths from a starting point to a destination point. For a given trip from a start location to a destination location, for example, received from a user, routing module 807 obtains route and map information 811 and determines all possible routes or paths from the starting location to reach the destination location. Routing module 807 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 804 and/or planning module 805. Decision module 804 and/or planning module 805 examine all of the possible routes to select and modify one of the most optimal routes in view of other data provided by other modules such as traffic conditions from localization module 801, driving environment perceived by perception module 802, and traffic condition predicted by prediction module 803. The actual path or route for controlling the ADV may be close to or different from the reference line provided by routing module 807 dependent upon the specific driving environment at the point in time.

Based on a decision for each of the objects perceived, planning module 805 plans a path or route for the autonomous driving vehicle, as well as driving parameters (e.g., distance, speed, and/or turning angle), using a reference line provided by routing module 807 as a basis. That is, for a given object, decision module 804 decides what to do with the object, while planning module 805 determines how to do it. For example, for a given object, decision module 804 may decide to pass the object, while planning module 805 may determine whether to pass on the left side or right side of the object. Planning and control data is generated by planning module 805 including information describing how vehicle 601 would move in a next moving cycle (e.g., next route/path segment). For example, the planning and control data may instruct vehicle 601 to move 10 meters at a speed of 30 miles per hour (mph), then change to a right lane at the speed of 25 mph.

Based on the planning and control data, control module 806 controls and drives the autonomous driving vehicle, by sending proper commands or signals to vehicle control system 611, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 805 plans a next route segment or path segment, for example, including a target position and the time required for the ADV to reach the target position. Alternatively, planning module 805 may further specify the specific speed, direction, and/or steering angle, etc. In one embodiment, planning module 805 plans a route segment or path segment for the next predetermined period of time such as 5 seconds. For each planning cycle, planning module 805 plans a target position for the current cycle (e.g., next 5 seconds) based on a target position planned in a previous cycle. Control module 806 then generates one or more control commands (e.g., throttle, brake, steering control commands) based on the planning and control data of the current cycle.

Note that decision module 804 and planning module 805 may be integrated as an integrated module. Decision module 804/planning module 805 may include a navigation system or functionalities of a navigation system to determine a driving path for the autonomous driving vehicle. For example, the navigation system may determine a series of speeds and directional headings to affect movement of the autonomous driving vehicle along a path that substantially avoids perceived obstacles while generally advancing the autonomous driving vehicle along a roadway-based path leading to an ultimate destination. The destination may be set according to user inputs via user interface system 613. The navigation system may update the driving path dynamically while the autonomous driving vehicle is in operation. The navigation system can incorporate data from a GPS system and one or more maps so as to determine the driving path for the autonomous driving vehicle.

According to one embodiment, a system architecture of an autonomous driving system as described above includes, but it is not limited to, an application layer, a planning and control (PNC) layer, a perception layer, a device driver layer, a firmware layer, and a hardware layer. The application layer may include user interface or configuration application that interacts with users or passengers of an autonomous driving vehicle, such as, for example, functionalities associated with user interface system 613. The PNC layer may include functionalities of at least planning module 805 and control module 806. The perception layer may include functionalities of at least perception module 802. In one embodiment, there is an additional layer including the functionalities of prediction module 803 and/or decision module 804. Alternatively, such functionalities may be included in the PNC layer and/or the perception layer. The firmware layer may represent at least the functionality of sensor system 615, which may be implemented in a form of a field programmable gate array (FPGA). The hardware layer may represent the hardware of the autonomous driving vehicle such as control system 611. The application layer, PNC layer, and perception layer can communicate with the firmware layer and hardware layer via the device driver layer.

Figure 9:
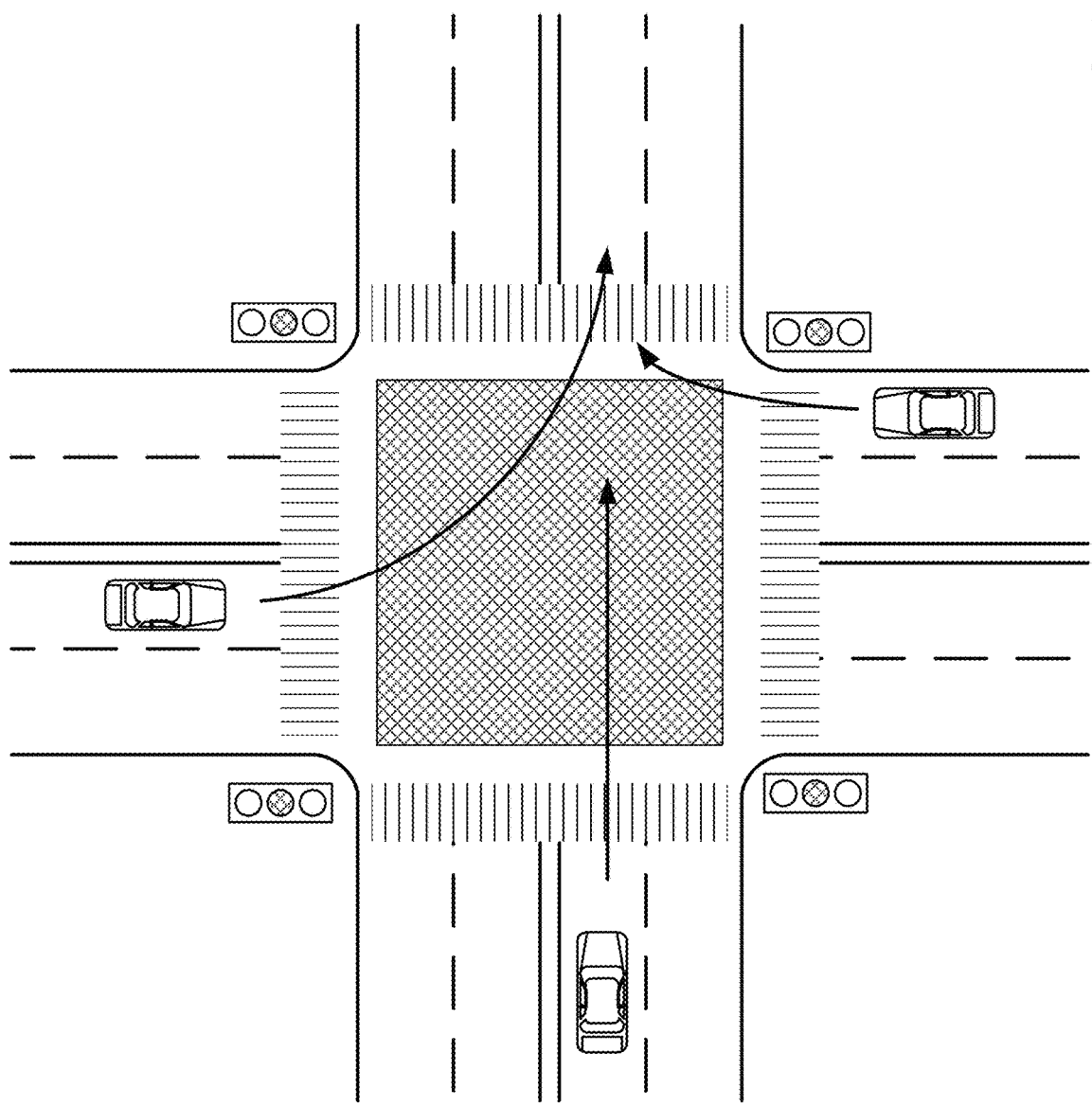
FIG. 9 illustrates a number of scenarios, according to aspects of the present disclosure.

FIG. 9 illustrates a number of scenarios (as indicated by the arrowed curvatures corresponding to controlled trajectories), according to aspects of the present disclosure. As shown, at an intersection, three driving scenarios are present: (1) a left turn overcoming incoming straight traffic, with lane selection possibilities; (2) a straight crossing with lane-change possibilities; and (3) a right turn with lane-change possibilities. A large dataset of expert demonstrations may include various maneuvers in response to different traffic conditions (including traffic controls and obstacles). Even in instances of a controlled traffic condition, expert demonstrations may still have variations in a probability distribution pattern, indicating speeds variations and turning radii variations.

The associated driving demonstration data may be categorized into respective types to associate vehicle controls (e.g., the pedals input 330 and turning input 340 of FIG. 3) to the sensing data of the traffic situations, which may be captured by various light sensors of cameras and LIDARs (e.g., the vehicle information 350 and the simulation settings 360 of FIG. 3). For example, the acceleration input may be associated with traffic light conditions and congestion conditions. Similarly, the steering input may be associated with road conditions, including a determination of whether a possible lane change is desired based on surrounding obstacles. As such, an autonomous driving algorithm may be trained specific to each traffic situation.

Figure 10:
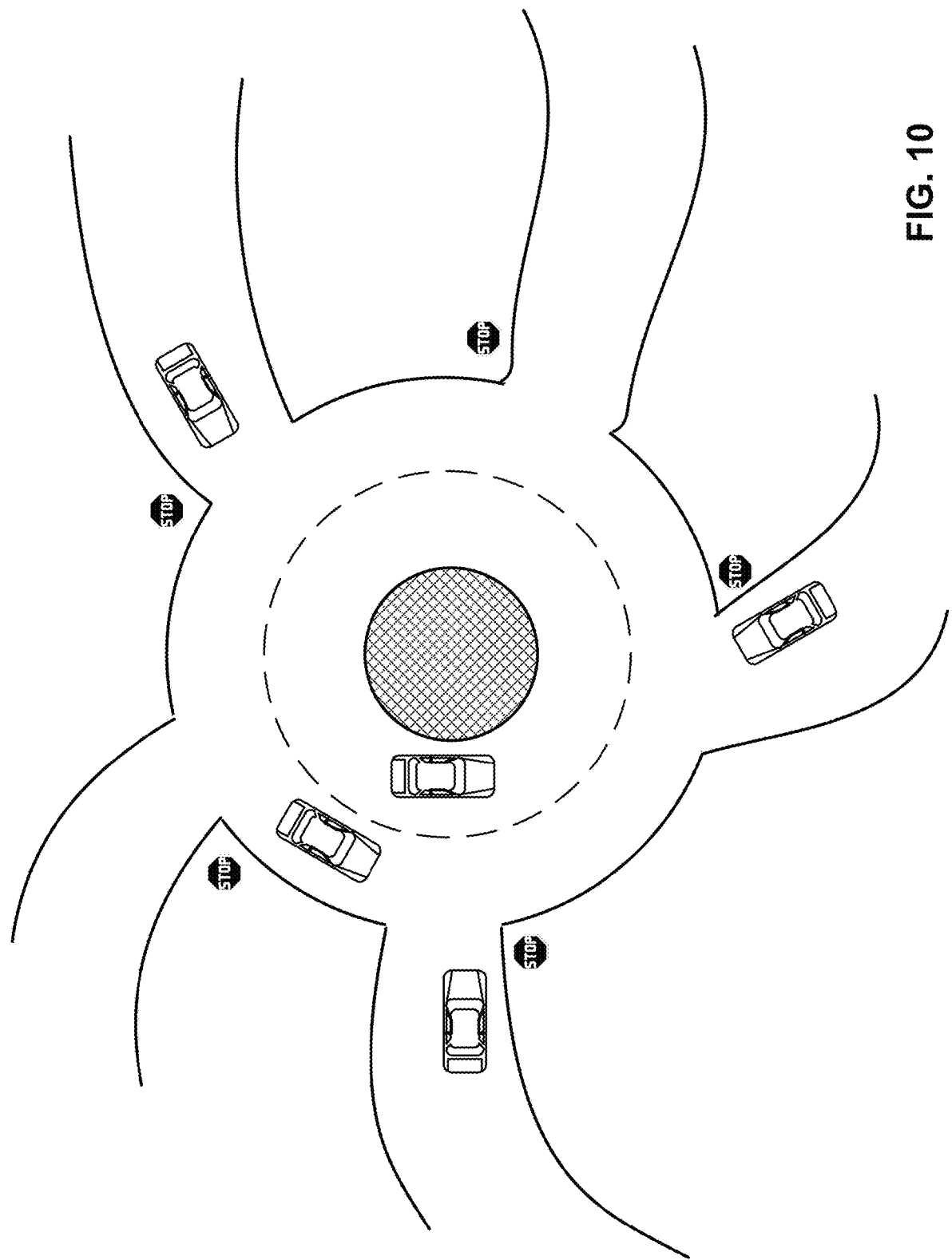
FIG. 10 illustrates a number of scenarios, according to aspects of the present disclosure.

FIG. 10 illustrates a number of scenarios for each vehicle shown, according to aspects of the present disclosure. The scenarios include: (1) approaching a roundabout (e.g., compliance to the stop signs or other traffic signs, such as one-way signs); (2) entering a roundabout (including timing determination in view of other entering vehicles, and joining the roundabout traffic); (3) traveling in a roundabout; (4) lane changing in a roundabout; and (5) exiting a roundabout. Expert demonstrations datasets (e.g., the driving demonstration data 305) may be collected and analyzed for each scenario. The scenario specific similarity scores may then be computed.

Figure 11:
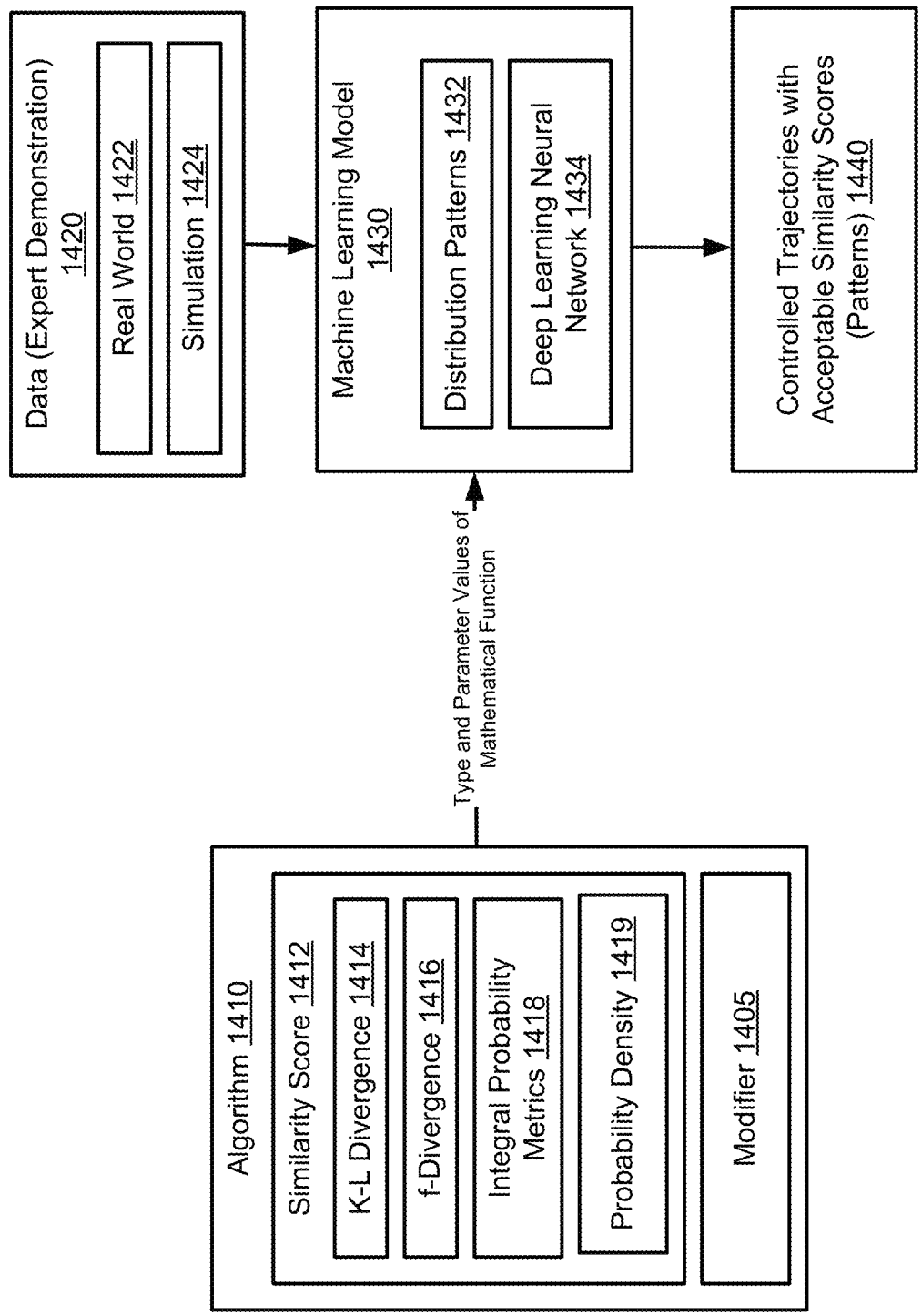
FIG. 11 illustrates an example block diagram of a machine learning algorithm based on similarity scores, according to aspects of the present disclosure.

FIG. 11 illustrates an example block diagram of a machine learning algorithm 1410 based on similarity scores, according to aspects of the present disclosure. As shown, a set of data 1420 of expert demonstrations may first be acquired (e.g., from various scenarios). The data 1420 may include both real world expert demonstration data 1422 and simulation data 1424. The data 1420 are provided to a machine learning model 1430.

The machine learning model 1430 may include distribution patterns 1432 computed based on the data 1420 and a deep learning neural network 1434 for generating controlled trajectories with the algorithm 1410. For example, the algorithm 1410 may generate a set of initial controlled trajectories (providing speeds and directions control in a scenario) and may update the set of initial controlled trajectories based on similarity scores 1412 and a modifier 1405 using parameters obtained in the deep learning neural network 1434.

The similarity score 1412 may be computed using various techniques for comparing probability distribution patterns (including both the distribution patterns of expert demonstrations and algorithmic output). For example, the similarity score 1412 may be computed as K-L divergence 1414, f-divergence 1416, or H-divergence (not shown). In some cases, the similarity score 1412 may be determined by one or more integral probability metrics 1418. In some cases, the similarity score 1412 may be evaluated based on a probability density 1419 of a predicted value of a probability density/distribution function (PDF) of the data 1420 distribution pattern. An algorithmic output having a higher similarity score has a less difference or deviation from the expert demonstrations probability distribution.

Based on the similarity scores 1412, the algorithm 1410 may improve parameters or aspects of the algorithm. For example, the modifier 1405 may modify assumptions, parameters, or conditions of the algorithm 1410 based on a feedback loop formed with the similarity scores 1412. The feedback loop may include a change (or step size) in values of the algorithm and monitor the change in the updated similarity scores. The type and parameter values of mathematical functions of the algorithm 1410 are provided to the machine learning model 1430, which may further process the distribution patterns 1432 based on the type and parameter values. For example, the distribution patterns 1432 may include an observed feature distribution of distances (or changes of positions), speeds (e.g., as measured), or accelerations (e.g., as measured). The distribution patterns 1432 may also include an embedding feature distribution of latent space feature in a deep learning layer of the deep learning neural network 1434. The deep learning layer of the deep learning neural network 1434 may process the set of data 1420 acquired in expert demonstrations.

The machine learning model 1430 may, after performing iterations (when needed) with the algorithm 1410 based on the similarity scores 1412, output one or more controlled trajectories 1440 with acceptable similarity scores or a distribution pattern of such trajectories to ADVs. The one or more controlled trajectories 1440 may be used as reference database, as well as actual driving instructions in applicable situations (e.g., matching scenarios and conditions).

Figure 12:
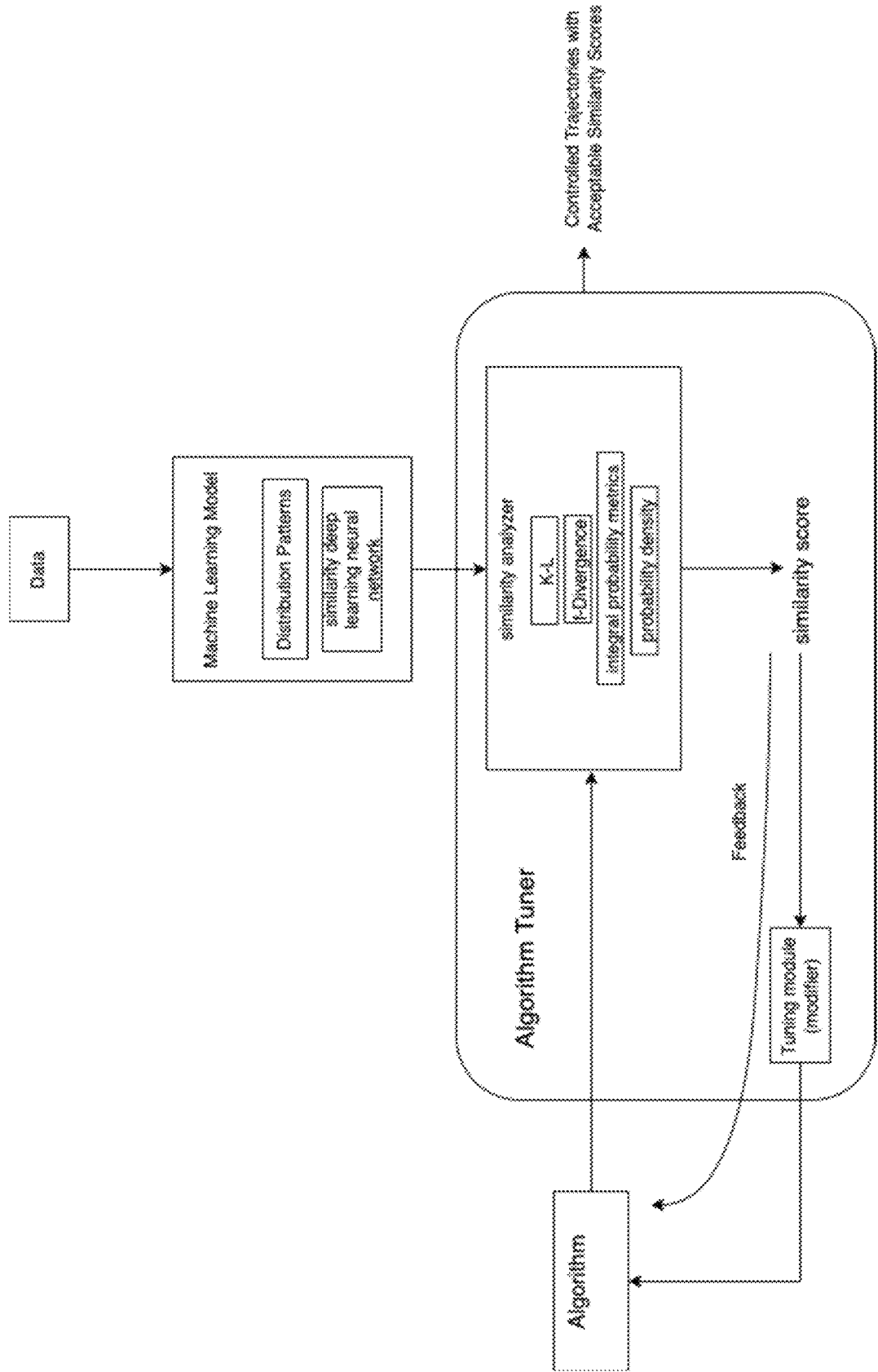
FIG. 12 illustrates an example block diagram of an algorithm tuner based on expert demonstration data and similarity analyzer, according to aspects of the present disclosure.

FIG. 12 illustrates an example block diagram of an algorithm tuner based on expert demonstration data and similarity analyzer, according to aspects of the present disclosure. As shown, the expert demonstration data is collected to train an example similarity neural network (SNN). The SNN performs as an analyzer by computing the similarity scores of algorithm output. The SNN may output a similarity score as a metric of the algorithm output. The algorithm tuner may use the similarity score to modify the algorithm for obtaining an improved trajectory that corresponds to a higher or improved similarity score. The similarity analyzer shown in FIG. 12 may be implemented as the planning module 805 or the control module 806 of FIG. 8. Likewise, the tuning module in FIG. 12 may be implemented as the planning module 805 or the control module 806 of FIG. 8.

Figure 13:
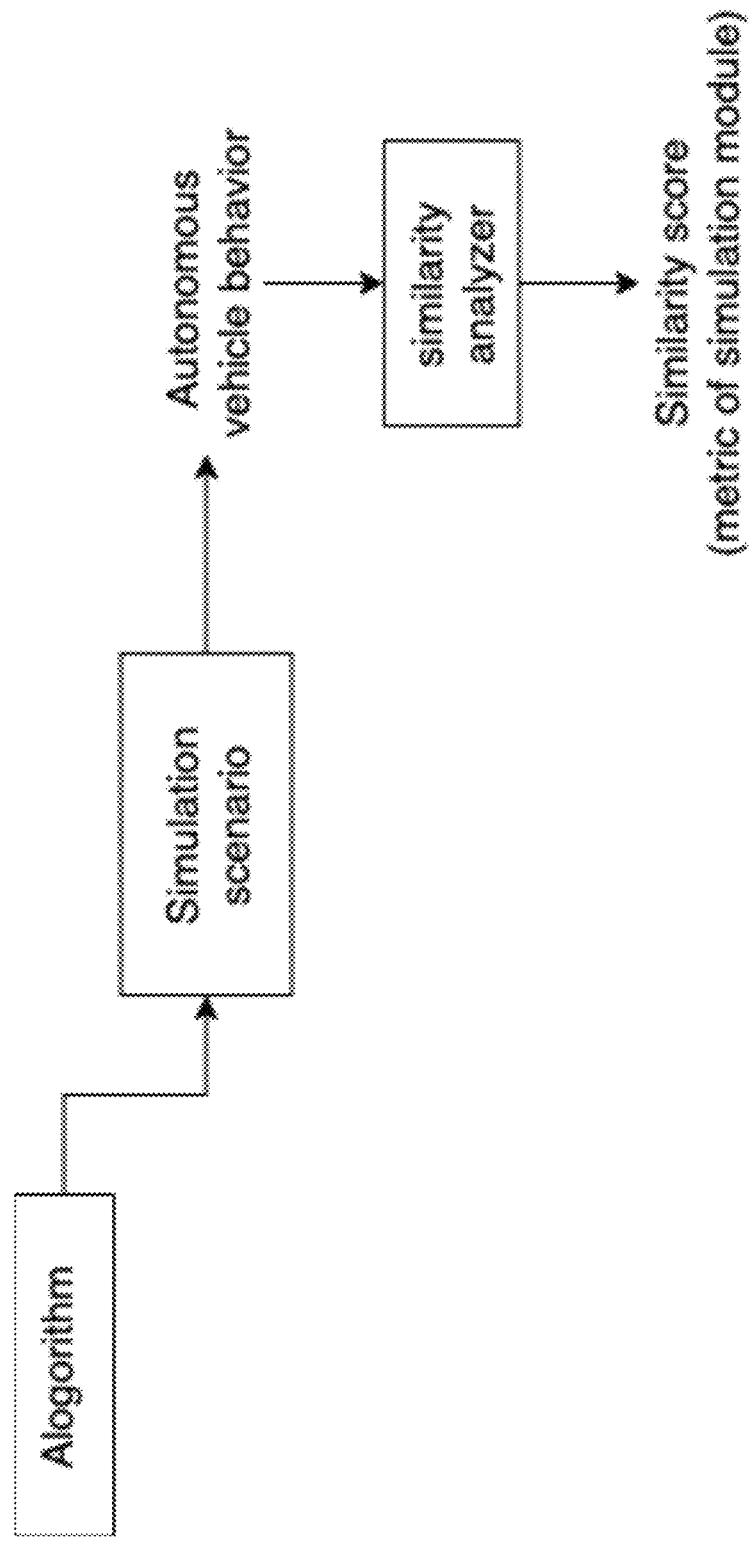
FIG. 13 illustrates an example block diagram of using similarity analyzer on simulation scenarios, according to aspects of the present disclosure.

FIG. 13 illustrates an example block diagram of using similarity analyzer on simulation scenarios, according to aspects of the present disclosure. As shown, the similarity analyzer of FIG. 12 may not only be part of the algorithm tuner, but also be an independent analyzing module. As illustrated in FIG. 13, the similarity analyzer may be used to output similarity scores, which measures the output of simulation result. The similarity scores are used as metrics in evaluating a simulation module (e.g., need not be limited by trajectory computation).

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method comprising:
    generating, by a processing device, a controlled trajectory of an autonomous driving vehicle (ADV) in a scenario, the controlled trajectory executable by the ADV to drive autonomously in the scenario;

receiving a set of data acquired in a plurality of driving demonstrations in the scenario;

identifying a distribution pattern of the set of data acquired, the distribution pattern indicating probabilities of driving trajectories in the scenario;

computing, by the processing device, a similarity score based on comparisons between the controlled trajectory and the distribution pattern of the plurality of driving demonstrations;

computing a first mean square error and a first similarity score between a first controlled trajectory generated by the processing device and the set of data of the plurality of driving demonstrations in the scenario;

computing a second mean square error and a second similarity score between a second controlled trajectory generated by the processing device and the set of data of the plurality of driving demonstrations in the scenario, wherein the first mean square error is greater than the second mean square error while the first similarity score is higher than the second similarity score; and controlling, by the processing device, the ADV based on the first and the second mean square errors and the first and the second similarity scores.

2. The computer-implemented method of claim 1, further comprising:

adjusting, based on the similarity score, at least one parameter in generating the controlled trajectory of the ADV in the scenario; and generating an updated controlled trajectory, wherein the updated controlled trajectory corresponds to an updated similarity score higher than the similarity score computed previously, the updated controlled trajectory executable by the ADV to drive autonomously in the scenario.

3. The computer-implemented method of claim 1, wherein generating the controlled trajectory of the ADV in the scenario comprises:

generating a plurality of candidate trajectories subject to a probability distribution pattern.

4. The computer-implemented method of claim 3, wherein computing the similarity score comprises at least one of:

calculating a Kullback-Leibler divergence;
calculating an f-divergence;
calculating an H-divergence;
determining one or more integral probability metrics; or
evaluating a probability density of a predicted value of a probability distribution function of the distribution pattern.

5. The computer-implemented method of claim 1, wherein the scenario comprises:

a starting location and an initial speed vector;
an ending location and a final speed vector; and
at least one of: a static side boundary, an available width along the static side boundary, a dynamic side boundary, or a width variation caused by the dynamic side boundary.

6. The computer-implemented method of claim 5, wherein the scenario comprises at least one of: a turn or a sequence change of directions, an overtake, a compliance to traffic signs, or a timed attempt thereof.

7. The computer-implemented method of claim 1, wherein the distribution pattern comprises an observed feature distribution of distances, speeds, or accelerations, or an embedding feature distribution of latent space features in a deep learning layer that processes the set of data acquired in the plurality of driving demonstrations.

8. The computer-implemented method of claim 1, wherein the plurality of driving demonstrations comprises demonstrations performed in a simulation environment.

9. A non-transitory machine-readable medium having instructions stored therein, which when executed by a processor, cause the processor to perform operations, the operations comprising:

generating a controlled trajectory of an autonomous driving vehicle (ADV) in a scenario, the controlled trajectory executable by the ADV to drive autonomously in the scenario;

receiving a set of data acquired in a plurality of driving demonstrations in the scenario;

identifying a distribution pattern of the set of data acquired, the distribution pattern indicating probabilities of driving trajectories in the scenario;

computing a similarity score based on comparisons between the controlled trajectory and the distribution pattern of the plurality of driving demonstrations;

computing a first mean square error and a first similarity score between a first controlled trajectory generated by the processor and the set of data of the plurality of driving demonstrations in the scenario;

computing a second mean square error and a second similarity score between a second controlled trajectory generated by the processor and the set of data of the plurality of driving demonstrations in the scenario, wherein the first mean square error is greater than the second mean square error while the first similarity score is higher than the second similarity score; and controlling, by the processor, the ADV based on the first and the second mean square errors and the first and the second similarity scores.

10. The machine-readable medium of claim 9, wherein the operations further comprise:

adjusting, based on the similarity score, at least one parameter in generating the controlled trajectory of the ADV in the scenario; and generating an updated controlled trajectory, wherein the updated controlled trajectory corresponds to an updated similarity score higher than the similarity score computed previously, the updated controlled trajectory executable by the ADV to drive autonomously in the scenario.

11. The machine-readable medium of claim 9, wherein generating the controlled trajectory of the ADV in the scenario comprises:

generating a plurality of candidate trajectories subject to a probability distribution pattern.

12. The machine-readable medium of claim 11, wherein computing the similarity score comprises at least one of:

calculating a Kullback-Leibler divergence;
calculating an f-divergence;
calculating an H-divergence;
determining one or more integral probability metrics; or
evaluating a probability density of a predicted value of a probability distribution function of the distribution pattern.

13. The machine-readable medium of claim 9, wherein the scenario comprises:

a starting location and an initial speed vector;
an ending location and a final speed vector; and at least one of: a static side boundary, an available width along the static side boundary, a dynamic side boundary, or a width variation caused by the dynamic side boundary.

14. The machine-readable medium of claim 13, wherein the scenario comprises at least one of: a turn or a sequence change of directions, an overtake, a compliance to traffic signs, or a timed attempt thereof.

15. The machine-readable medium of claim 9, wherein the distribution pattern comprises an observed feature distribution of distances, speeds, or accelerations, or an embedding feature distribution of latent space features in a deep learning layer that processes the set of data acquired in the plurality of driving demonstrations.

16. The machine-readable medium of claim 9, wherein the plurality of driving demonstrations comprises demonstrations performed in a simulation environment.

17. A processing device, comprising:
a processor; and
a memory coupled to the processor and storing instructions, which when executed by the processor, cause the processor to
generate a controlled trajectory of an autonomous driving vehicle (ADV) in a scenario, the controlled trajectory executable by the ADV to drive autonomously in the scenario;
receive a set of data acquired in a plurality of driving demonstrations in the scenario;
identify a distribution pattern of the set of data acquired, the distribution pattern indicating probabilities of driving trajectories in the scenario;
compute, by the processing device, a similarity score based on comparisons between the controlled trajectory and the distribution pattern of the plurality of driving demonstrations;
compute a first mean square error and a first similarity score between a first controlled trajectory generated by the processing device and the set of data of the plurality of driving demonstrations in the scenario;
compute a second mean square error and a second similarity score between a second controlled trajectory generated by the processing device and the set of data of the plurality of driving demonstrations in the scenario, wherein the first mean square error is greater than the second mean square error while the first similarity score is higher than the second similarity score; and
control, by the processing device, the ADV based on the first and the second mean square errors and the first and the second similarity scores.

18. The processing device of claim 17, wherein the instructions further cause the processor to:
adjust, based on the similarity score, at least one parameter in generating the controlled trajectory of the ADV in the scenario; and
generate an updated controlled trajectory, wherein the updated controlled trajectory corresponds to an updated similarity score higher than the similarity score computed previously, the updated controlled trajectory executable by the ADV to drive autonomously in the scenario.

* * * * *